United States Patent Office 2,705,374
Patented Apr. 5, 1955

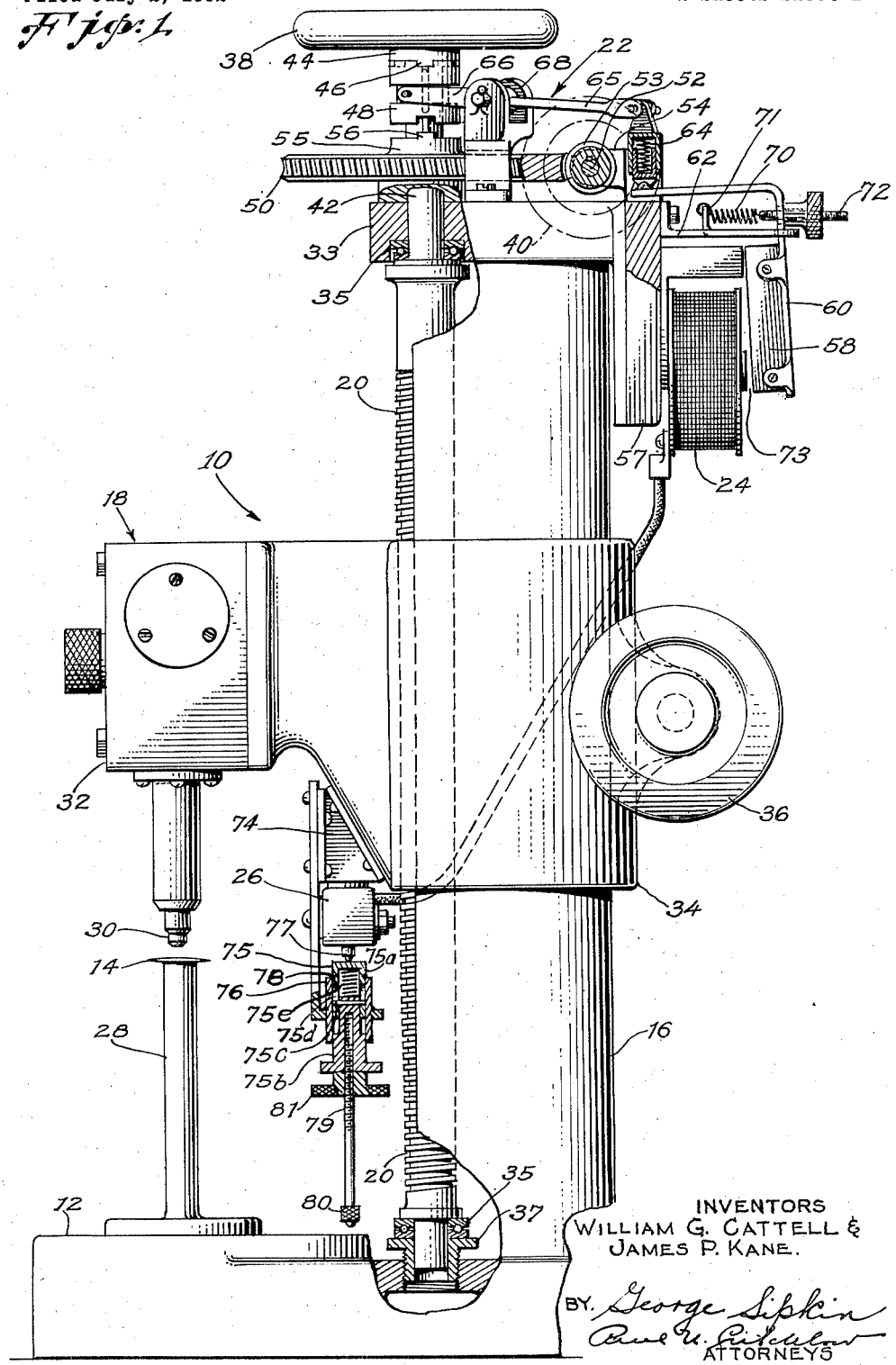

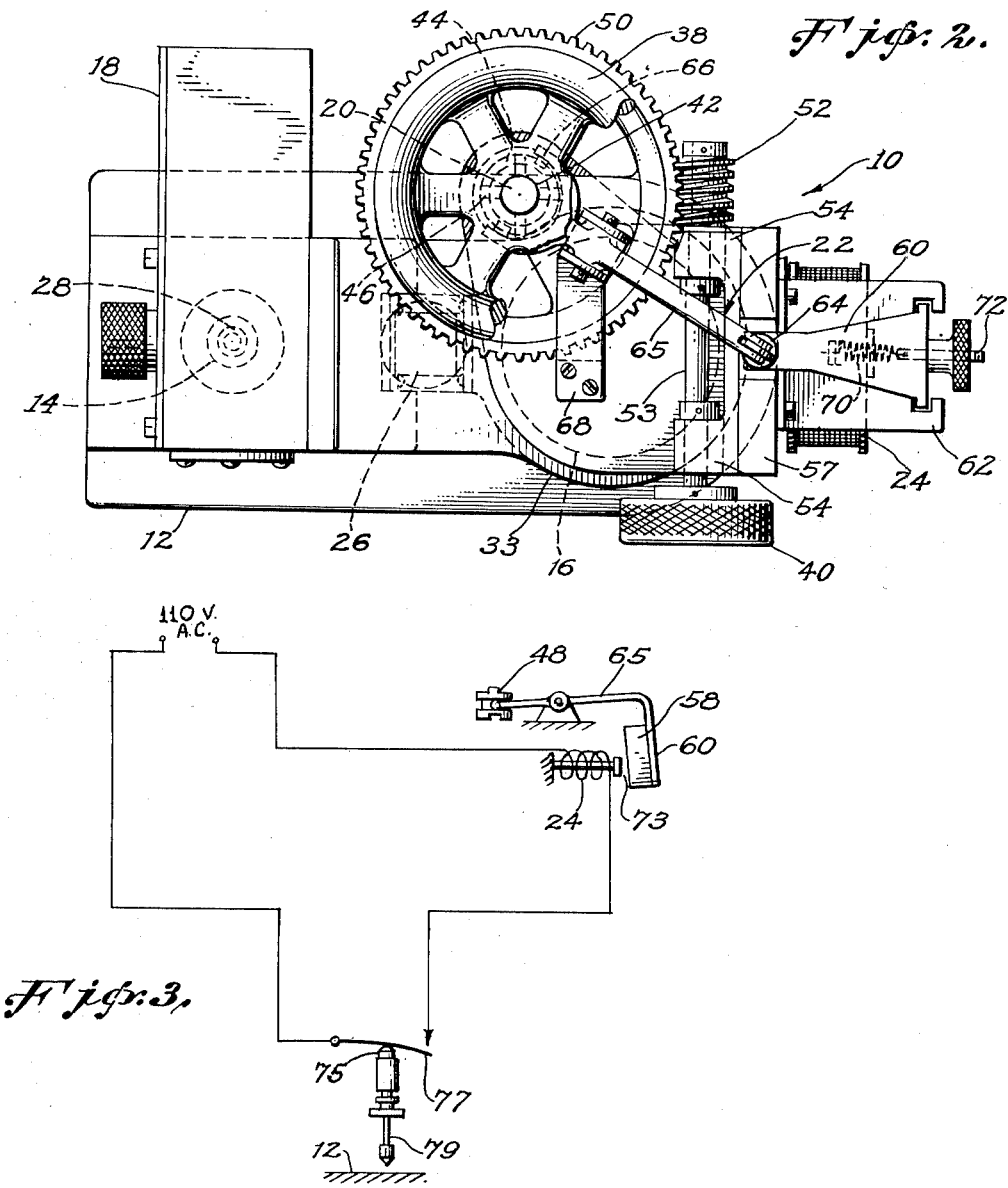

2,705,374

ATTACHMENT FOR ELECTRO-LIMIT GAUGES

William G. Cattell, Napa, and James P. Kane, Vallejo, Calif.

Application July 2, 1952, Serial No. 296,976

11 Claims. (Cl. 33—147)

(Granted under Title 35, U. S. Code (1952), sec. 266)

This invention relates to measuring apparatus, and, in particular, to mechanisms for finely controlling the advance of the measuring heads of such apparatus.

This invention may be manufactured and used by or for the Government of the United States of America for governmental purposes without the payment of any royalties thereon or therefor.

Unusually fine or accurate thickness measurements of articles can be obtained by the use of a so-called electro-limit gauge in which an electrically-sensitive head is fed into contact with the article and a signal transmitted to an indicating meter that reads in conformity with the head movement. Such gauges may be suitable for most purposes, but their use for measuring the thicknesses of fragile articles, such as quartz crystals, has proven unsatisfactory principally because the articles could not be contacted with sufficient gentleness to avoid crystal breakages. Also, the use of these gauges in many types of thickness measurements is not as satisfactory as could be desired because this same inability to control the feed frequently produces shocks or jars upon contacting the crystals with the result that the delicate mechanism of the head may be injured or deranged.

Due to these difficulties the use of such gauges for almost any purpose required the utmost skill and training in its operators, but, as indicated, the more serious disadvantages involved in their use become more apparent when attempts are made to measure the thickness of fragile objects, such as quartz frequency crystals in which permissible thickness variations and tolerances frequently are in the neighborhood of 10 to 30 micro or millionths inches. With such fine measurements required, it becomes easy to appreciate that considerable difficulty has been experienced in bringing the measuring heads into a gentle contact with the crystals. For one reason, it is almost impossible to see such fractional spacings between the crystals and the measuring heads during the final advance into crystal contact so that, even the most skillful operators could not visually determine the amount of feed necessary to effect final contact. As a result, they, as well as the less skilled workers, broke many crystals. An additional factor rendering such measurements even more impracticable was a certain amount of mechanical play in the measuring head mountings, such play affecting the available feed control and throwing off indicator readings.

Accordingly, one of the principal objects of this invention is to provide an unusually accurate and fine measuring apparatus that is capable of contacting fragile objects with such gentleness as to avoid injury to the objects or disturbance in the measuring mechanism.

Another important object of this invention is to provide such a mechanism with a micrometer feed engageable at a predetermined position during the approach of the measuring head toward the article to be measured and exclusively operable to continue the feed of the head into ultimate contact with the article.

A further object of this invention is to provide a warning system that will signal the operator when the measuring apparatus has reached this predetermined position where the micrometer feed "takes over."

Other objects are to increase feed control accuracy by eliminating mechanical play in the component parts; to reduce the time required to measure the articles; to render the apparatus usable by unskilled operators; and to minimize the danger from improper usage.

Additional objects will become apparent from the detailed description of the specification.

The apparatus provided utilizes a fine and a coarse feed for the measuring head, the coarse feed normally being engaged to control the movement of the measuring head toward the article to be measured. When the head reaches a predetermined point in its travel, the coarse feed is disengaged automatically and the fine feed engaged to permit the measuring head to be finally moved into gentle and smooth contact with the article. Preferably, a warning system is provided to notify the operator that the measuring head has reached this predetermined point in its travel. Most suitably, the coarse feed is disengaged automatically and the actuating mechanism for effecting this disengagement is such that the fine feed must be utilized to advance the head further toward the work.

The preferred embodiment of the invention is illustrated in the accompanying drawings, of which Fig. 1 is a partially sectioned side elevation of the apparatus; Fig. 2 is a plan view; and Fig. 3 a schematic wiring diagram of an electrical circuit used for automatic actuation of measuring head feed controls.

Referring to the drawings, the gauge, generally designated by reference numeral 10, is formed of a base 12 on which is supported an article 14, and, extending upwardly from the base, is a standard 16 adapted to slideably support a conventional electrical measuring head 18, this head being reciprocable vertically of the standard into engagement with the article by a feed screw 20, which, in turn, is driven both by a coarse and a fine feed. Linkage 22 is provided to alternatively effect a driving engagement between one or the other of these feeds and feed screw 20. An associated electrical relay 24 and a limit switch 26 also are employed to permit automatic selection of the feed desired. Article 14 may vary greatly in size and thickness, the example illustrated being a thin, fragile quartz crystal commonly used for radio frequency selection and, to facilitate measuring operations, a pedestal 28 is used to support the crystal in an elevated position.

Measuring head 18, which for the most part is of a conventional design, includes a sensitive spring-loaded plunger 30 slideably mounted in an electrical transmitter 32 that transmits an electrical signal to a meter (not shown), to indicate in micro-inches the advance of the plunger, such meters being well known and forming no part of this invention. Transmitter 32 is contained in a sleeve 34 slideably supported on standard 16 and threaded to receive feed screw 20 by which it is driven; a cam lock 36 being provided on the sleeve to secure the measuring head to standard 16 when a plurality of the same size crystals are being measured. The feed screw is mounted at its lower end on base 12 and at its upper end to a cap flange 33 by thrust bearings 35, the thrust bearing at the base being provided with an adjustable sleeve 37 to take up any play in the screw.

The drive for feed screw 20 is provided by a coarse control handwheel 38 and a fine control handwheel 40, handwheel 38 being freely rotatable on a feed screw extension 42 and having a hub portion 44 provided with teeth 46 adapted to engage a claw-type clutch dog 48 slideably splined to screw extension 42. Handwheel 40 is connected to wormwheel 50 (Fig. 2) through a worm 52 and a shaft 53, the latter being supported in top flange 33 by bearings 54. Wormwheel 50 is somewhat similar to handwheel 38, in that it is freely mounted on screw extension 42 and has a hub 55 and teeth 56 for engagement with clutch dog 48.

It has been found satisfactory in practice to construct the worm and wormwheel with a feed ratio of 100 to 1, or, in other words, a ratio in which 100 turns of fine handwheel 40 is equivalent to one turn of the wormwheel. With this ratio, one complete turn of the fine handwheel will move the measuring head .001 inch. As may be expected, clutch dog 48 is moveable to engage either handwheel, its movements being dependent upon the energization of electrical relay 24, that, in turn, is controlled by limit switch 26, later to be described.

Relay 24 is a 110 volt A. C. 60 cycle, single phase modified coil shaded pole relay bolted to a backing plate 57 secured to cap flange 33, while relay armature 58 has an L-shaped link support 60 pivotally mounted on bracket 62 fixed to backing plate 57, the upper end of support 60 being pinned through spring-loaded link 64 to a clutch dog arm 65, bifurcated at its end to form a yoke 66 for loosely engaging and slideably moving clutch dog 48. A fixed pivot support is provided for arm 65 by means of a bracket 68 secured to the upper surface of cap flange 33.

Clutch dog 48 through the above linkage is engaged to coarse feed handwheel 38 when the relay is deenergized, this engagement being effected by a spring 70 anchored by lip 71 to arm 62, as well as to armature support 60 by an adjustable thumb screw 72. Spring-loaded link 64 functions to absorb the strain on the linkage when the relay has been energized but full engagement of the clutch dog and wormwheel 50 is prevented because normally they are not disposed in a suitable rotated position for meshing. Fine feed handwheel 40 usually must be turned to permit such meshing, compressed link 64 assuring positive engagement when the teeth are aligned.

When the relay is deenergized, armature 58, as shown in Fig. 1, is spaced from the pole by a gap 73 and, upon energization of the relay the alternating current flow through the relay coil sets up an alternating field across the gap which produces a buzzing sound presently utilized as a warning signal. As indicated, this gap is maintained until the fine handwheel is connected to the clutch so that such a warning buzzer indicates to the operator the fact that the limit switch has energized the control circuit and that the fine feed must be engaged by rotating its handwheel 40. A minimum number of teeth are provided on the clutch dog to insure that the armature will not close the gap unless the fine control handwheel is rotated by the operator. The size of the gap may be adjusted by screw 72 which controls the tension of spring 70. If desired, a separate warning signal system, independent of the relay, may be provided, or a visual warning light connected in the wiring diagram disclosed in Fig. 3.

Limit switch 26, which controls the moveable clutch, is fixed to measuring head sleeve 34 by a bracket 74 that also supports a limit switch rod 75 slidably carried in a small barrel 76. The limit switch rod 75 is made up of male and female parts 75b and 75a, respectively, the former having a pin 75c slidable in slot 75d of part 75a. A compression spring 75e is positioned between the parts to urge part 75a upwardly toward a limit switch contact 77 (Fig. 3). Contact 77 is sprung normally to an open position against the action of spring 75e, urging rod 75 to an extended position toward the base limited in movement by retainer ring 78. A limit rod extension 79 is threadedly mounted on part 75b and terminates in a replaceable tip 80 adapted to engage base 12 of the measuring gauge when the measuring head reaches its predetermined position in its travel toward article 14. Spring 75e will absorb any shock created by the initial contact of the limit rod extension with the base and will protect the limit switch from any excess movements of the measuring head after the article is contacted.

To set the limit switch for operating, the approximate thickness of the articles to be measured first must be ascertained and the safety zone desired before the measuring head engages the article also taken into consideration. For example, a safety zone of .010″ has been found to be satisfactory so that, by the use of a gauge block, the end of measuring head plunger 30 can be set from the pedestal top the combined estimated thickness of the crystal and this safety zone, the length of the limit switch rod extension 79 then being adjustable, upon release of lock nut 81, to engage base 12. Obviously, if a different size pedestal is used the length of the limit switch rod extension may be made adjustable.

In operation, with the limit switch properly set, coarse control handwheel 38 being connected to feed screw 20 through clutch dog 48 and relay armature 58 being spaced from its coil by gap 73, coarse feed handwheel 38 is turned to move the measuring head toward the article. This feed maintains control until the limit switch rod contacts the base and closes the limit switch to energize relay 24 and actuate the feed clutch. The relay commences to buzz to notify the operator that the measuring head has entered the danger zone and this signal continues until fine control handwheel 40 is rotated by the operator to the position in which the clutch dog is aligned with the wormwheel teeth, at which time spring-loaded link 64 forces the clutch dog into engagement and frees the linkage and armature to close the gap. Cessation of the buzzing is a signal indicating the engagement of the fine feed.

The measuring head now is moveable only by the fine handwheel and the head may be moved into gentle contact with the crystal. It is of particular importance to note here that, once the coarse feed has been disengaged, the fine feed must be used for any further advance of the head into contact. There is no way, short of disconnecting all power lines that will permit the use of the coarse feed for this final approach and, if the power is so shut-off, the desired electric indications cannot be obtained. This irreversibility of the clutch mechanism is an intentional asset of the invention since its existence absolutely requires the use of the fine feed, and such a fine feed can be used without danger by unskilled workers. After the necessary measurements have been obtained, the measuring head is backed off from the crystal first by the fine control handwheel and then by the coarse feed after the relay has become deenergized.

By use of the fine feed the article to be measured can be gently contacted permitting accurate measurements and avoiding breakage to the crystal or damage to the delicate head by jarring that might otherwise occur if a relatively coarse control were used in making the contact. The control of the feed is automatically selected, a fact which relieves the operator of the mental strain of estimating the point of contact. The warning system notifies the operator when to shift controls and this reduces the time required for each measuring operation. When a 110 volt A. C. relay is utilized and means are provided to maintain an air gap when the relay is energized, the relay functions both as a clutch control and a buzzer warning, although a separate warning system may be provided if desired.

Obviously many modifications and variations of the present invention are possible in the light of the above teachings. It is, therefore, to be understood that within the scope of the appended claims the invention may be practiced otherwise than as specifically described.

We claim:

1. A gauge for measuring an article comprising a base, a rotatable feed screw supported on the base, a measuring head threadedly mounted on the feed screw, manually operable coarse and fine feed mechanisms alternatively connectible to the feed screw for advancing and retracting the measuring head with respect to the article, clutch mechanism for connecting alternatively said coarse and fine feed mechanism, switching mechanism automatically actuating said clutch mechanism at a predetermined position during the advance of said measuring head for disengaging the coarse feed mechanism, said fine feed mechanism operable upon said disengagement for further advancing the measuring head into contact with the article, said switching mechanism manually irreversibly maintaining said disengagement during said further advance, whereby the fine feed must be operated to further advance the measuring head.

2. A gauge for measuring an article comprising a base, a rotatable feed screw supported on the base, a measuring head threadedly mounted on the feed screw, manually operable coarse and fine feed mechanism alternatively connectible to the feed screw for advancing and retracting the measuring head with respect to the article, clutch mechanism for connecting alternatively said coarse and fine feed mechanism, switching mechanism automatically actuating said clutch mechanism at a predetermined position during the advance of said measuring head for disengaging the coarse feed mechanism, said fine feed mechanism operable upon said disengagement for further advancing the measuring head into contact with the article, signalling means for warning the operator of the operation of the disengagement mechanism, said switching mechanism manually irreversibly maintaining said disengagement during said further advance, whereby the fine feed must be operated to further advance the measuring head.

3. A gauge for measuring an article comprising a base, a rotatable feed screw, a thrust bearing for supporting the feed screw on the base, a measuring head threadedly mounted on the feed screw, manually operable coarse and fine feed mechanism alternatively connectible to the feed screw for advancing and retracting the measuring head with respect to the article, mechanism automatically operable at a predetermined position during the advance of said measuring head for disengaging the coarse feed mechanism, said fine feed mechanism operable upon said disengagement for further advancing the measuring head, said mechanism irreversibly maintaining said disengagement during said further advance, whereby the fine feed must be operated to further advance the measuring head.

4. A gauge for measuring an article comprising a base, a rotatable feed screw supported on the base, a measuring head threadedly mounted on the feed screw, manually operable coarse and fine feed mechanism alternatively connectible to the feed screw for advancing and retracting the measuring head with respect to the article, resilient means for maintaining said coarse feed mechanism normally connected to the feed screw, clutch mechanism for connecting alternatively said coarse and fine mechanism, switching mechanism automatically actuating said clutch mechanism at a predetermined position during the advance of said measuring head for disengaging the coarse feed mechanism, said fine feed mechanism operable upon said disengagement for further advancing the measuring head into contact with the article, said switching mechanism manually irreversibly maintaining said disengagement during said further advance, whereby the fine feed must be operated to further advance the measuring head.

5. A gauge for measuring an article comprising a base, a rotatable feed screw supported on the base, a measuring head threadedly mounted on the feed screw, manually operable coarse and fine feed mechanism alternatively connectible to the feed screw for advancing and retracting the measuring head with respect to the article, clutch mechanism for connecting alternatively said coarse and fine feed mechanism, switching mechanism for automatically controlling said clutch mechanism at predetermined position during the advance of said measuring head for disengaging the coarse feed mechanism, said switching mechanism including a longitudinally adjustable rod extending in the direction of a head movement for selecting said position, a relay connected to the clutch and operable by said switching mechanism for disengaging the clutch, said fine feed mechanism operable upon said disengagement for further advancing the measuring head into contact with the article, said switching mechanism manually irreversibly maintaining said disengagement during said further advance, whereby the fine feed must be operated to further advance the measuring head.

6. A gauge for measuring an article comprising a base, a rotatable feed screw supported on the base, a measuring head threadedly mounted on the feed screw, manually operable coarse and fine feed mechanism alternatively connectible to the feed screw for advancing and retracting the measuring head with respect to the article, clutch mechanism for connecting alternatively said coarse and fine feed mechanism, switching mechanism for automatically controlling said clutch mechanism at a predetermined position during the advance of said measuring head for disengaging the coarse feed mechanism, a relay connected to the clutch and operable by said switching mechanism for disengaging the clutch, said clutch mechanism being adapted to maintain an air gap in said relay until said fine feed mechanism is engaged whereby said relay provides a signaling system for warning the operator of the disengagement of the coarse handwheel, said fine feed mechanism operable upon said disengagement for further advancing the measuring head into contact with the article, said switching mechanism manually irreversibly maintaining said disengagement during said further advance, whereby the fine feed must be operated to further advance the measuring head.

7. A gauge for measuring an article comprising a base, a rotatable feed screw supported on the base, a measuring head threadedly mounted on the feed screw, manually operable coarse and fine feed mechanism alternatively connectible to the feed screw for advancing and retracting the measuring head with respect to the article, means for maintaining said coarse feed mechanism normally connected to the feed screw, clutch mechanism for connecting alternatively said coarse and fine feed mechanism, switching mechanism for automatically controlling said clutch mechanism when the measuring head advances to within a predetermined zone from said article for disengaging the coarse feed mechanism, a relay connected to the clutch and energized by said switching mechanism for disengaging the clutch, said fine feed mechanism operable upon said disengagement for further advancing the measuring head into contact with the article, said switching mechanism being energized at all times when said measuring head is within the zone and irreversibly maintaining said disengagement during said further advance, whereby the fine feed must be operated to further advance the measuring head.

8. A gauge for measuring an article comprising a rotatable feed screw, a measuring-head threadedly mounted on said screw, manually operable coarse and fine measuring-head feed mechanisms alternately connectible to the screw, and mechanism automatically operable at a predetermined position during the advance of the measuring head for disengaging the coarse feed whereupon said fine feed mechanism is connectible for further advancing the measuring head.

9. A gauge for measuring an article comprising a rotatable feed screw, a measuring head threadedly mounted on said screw, manually operable coarse and fine measuring-head feed mechanisms alternately connectible to the screw, and mechanism automatically operable at a predetermined position during the advance of the measuring head for disengaging the coarse and engaging the fine feed mechanisms, whereupon said fine feed mechanism is operable for further advancing the measuring head.

10. A gauge for measuring an article comprising a rotatable feed screw, a measuring head threadedly mounted on said screw, manually operable coarse and fine measuring head feed mechanisms alternately connectible to the screw, and mechanism automatically operable at a predetermined position during the advance of the measuring head for disengaging the coarse and engaging the fine feed mechanisms, whereupon said fine feed mechanism is operable for further advancing the measuring head, said automatically operable mechanism irreversibly maintaining said disengagement during said further advance whereby the fine feed must be operated to further advance the measuring head.

11. A gauge for measuring an article comprising a rotatable feed screw, a measuring head threadedly mounted on said screw, manually operable coarse and fine measuring-head feed mechanisms alternately connectible to the screw, mechanism automatically operable at a predetermined position during the advance of the measuring head for disengaging the coarse and engaging the fine feed mechanisms whereupon said fine feed mechanism is operable for further advancing the measuring head, and signal means for warning the operator of said disengagement mechanism operation.

References Cited in the file of this patent

UNITED STATES PATENTS

| | | |
|---|---|---|
| 1,196,188 | Walberg | Aug. 29, 1916 |
| 1,265,269 | Sipp | May 7, 1918 |
| 1,656,927 | Wheelock | Jan. 24, 1928 |
| 1,840,276 | Parkhurst | Jan. 5, 1932 |
| 1,950,509 | Melling | Mar. 13, 1934 |
| 2,324,727 | Shartle | July 20, 1943 |
| 2,627,119 | Graham | Feb. 3, 1953 |
| 2,654,956 | Francis | Oct. 13, 1953 |

FOREIGN PATENTS

| | | |
|---|---|---|
| 956,340 | France | Jan. 30, 1950 |